United States Patent [19]

Peck

[11] 4,105,294
[45] Aug. 8, 1978

[54] ELECTROSTATIC DEVICE

[75] Inventor: David B. Peck, Williamstown, Mass.

[73] Assignee: Dielectric Systems International, Inc., Williamstown, Mass.

[21] Appl. No.: 711,612

[22] Filed: Aug. 4, 1976

[51] Int. Cl.$^2$ .............................................. G02F 1/16
[52] U.S. Cl. ................................... 350/269; 358/300
[58] Field of Search ................... 350/161 S, 266, 269; 178/7.3 D, 7.5 D

[56] References Cited

U.S. PATENT DOCUMENTS

| 1,984,683 | 12/1934 | Jenkins | 350/269 |
| 3,553,364 | 1/1971 | Lee | 350/269 |
| 3,897,997 | 8/1975 | Kalt | 350/161 S |
| 3,989,357 | 11/1976 | Kalt | 350/269 |

Primary Examiner—William L. Sikes

[57] ABSTRACT

In an electrostatic device for the gating of electromagnetic radiation in response to an electrical signal, including a rod shaped fixed electrode and a resilient variable electrode sheet with a film of insulation interposed therebetween. The variable electrode sheet is pressed into a groove in a base plate. The fixed electrode is mounted in the groove over the variable electrode. The assembly of this simple device requires a minimum of noncritical steps.

5 Claims, 2 Drawing Figures

ELECTROSTATIC DEVICE

BACKGROUND OF THE INVENTION

This invention relates to an electrostatic device for the gating of electromagnetic radiation having a resilient variable electrode. An insulative film is bonded to either a fixed or the variable electrodes so as to provide electrical insulation between the two electrodes. In some prior devices of this kind the variable electrode is mounted to the fixed electrode. It is particularly difficult in such structures to provide a mounting of the fixed electrode that does not induce wrinkles in the thin resilient electrode. When the mounting of the variable electrode is spaced from the fixed electrode and the variable electrode is straight in this space, the wrinkles emanating from the mounting are attenuated but still remain a source of variability in sensitivity. In either case much care is required in the mounting of the resilient variable electrode to minimize the wrinkles that tend to be formed there. Examples of prior art devices of the improved kind are described in U.S. Pat. No. 3,897,997 issued Aug. 5, 1975.

Such wrinkles tend to radiate away from the mounting and make the variable electrode stiffer. This in turn raises the sensitivity of the light gate to an electrical signal that is applied between the two electrodes to cause the variable electrode to be drawn to and become coadunate with the fixed electrode. Furthermore, in manufacturing a large number of such devices the sensitivity of the devices from unit to unit is not uniform.

It is therefore an object of this invention to provide an electrostatic gating device having a low sensitivity to an applied electrical signal by eliminating wrinkles in the variable electrode.

It is a further object of this invention to provide an electrostatic light gate having a more uniform and predictable sensitivity to an applied electrical signal.

It is a further object of this invention to provide an electrostatic light gate capable of being assembled in a simple noncritical manner.

SUMMARY OF THE INVENTION

An electrostatic device for the gating of electromagnetic radiation in response to an electrical signal includes a rod shaped fixed electrode, a sheet of resilient conductive material, a film of insulative material being interposed between the fixed electrode and the resilient sheet, and a metal base having a groove therein.

The fixed electrode rod may have one or many parallel axes of curvature. A central region of the resilient sheet is mounted between the fixed electrode and the bottom of the groove. Two opposite end portions of the resilient sheet extend in opposite directions from the mounting. Each end portion curves further extending outwardly from the groove and is spring loaded between an outer edge of the groove and a line of tangency at which the resilient sheet is tangent to the fixed electrode. The two extending end portions of the resilient sheet serve as two variable electrodes capable of being electrostatically drawn over the fixed electrode when a voltage is applied between the conductive sheet and the fixed electrode.

In one construction, the fixed electrode has a curved surface portion that includes the above noted line of tangency with the variable electrode. In another construction the variable electrode has a curved surface portion that includes the above noted line of tangency with the fixed electrode. In any case, the axes of electrode curvature are essentially parallel with the line of tangency and the bend is convex toward the fixed electrode.

It has been found that to substantially space the position of mounting of the variable electrode from the line of tangency with the fixed electrode and to provide a curved surface in the variable electrode within this space is highly advantageous. This curvature eliminates the wrinkles that are likely to be present in the thin variable electrode near the line of tangency and consequently tends to increase the sensitivity of this light gate to electrical signals. Also the sensitivity of such light gates is much more uniform from unit to unit. It is no longer necessary to take great pains to provide a wrinkle free mounting of the variable electrode which leads to simpler manufacturing methods and lower costs. It has furthermore been found that the procedure for assembly of the improved device of this invention is greatly simplified as will be further elaborated below.

DESCRIPTION OF THE PREFERRED EMBODIMENT

Figure 1:
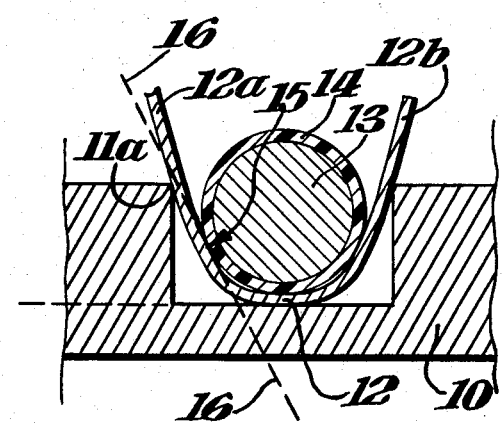
FIG. 1 shows a side sectional view of a first embodiment of an electrostatic device of this invention.

An electrostatic device is shown in FIG. 1 having a metal base plate 10 with a rectangular groove 11 in the top surface. A sheet of conductive resilient material 12 is positioned in the groove 11. A metal rod 13 having an insulative dielectric film 14 covers the curved outer surfaces of the rod 13. The resilient sheet is mounted in a central region thereof (lowest region as shown) between the insulated metal rod and the bottom of the groove. This may be achieved by bonding the three members 14, 12 and 10 as for example using a contact cement. The conductive sheet 12 makes electrical contact with the base plate 10 but remains insulated from the rod 13.

The resilient sheet extends in opposite directions from the location of mounting, each end thereof curving upwardly in the space between the walls of the groove and the insulated rod. Each extending end portion of the resilient sheet is bent, rests against an outer edge, e.g. 11a of the groove 11 and is consequently spring loaded against the insulated curved surface of the rod at a line of tangency as seen in end view and indicated at the arrow 15.

The line of tangency 15 lies in a plane of tangency 16, indicated by a dashed line, and the angle between the plane of the mounting of the resilient sheet, namely the plane of the bottom of the rectangular groove 11, and the plane of tangency is substantial. This angle corresponds to the degree of bend in the sheet end portion 12a between its mounting and the line of tangency at which it further extends away from the rod. This bend effectively eliminates wrinkles in the sheet 12 at the line of tangency and thus eliminates in a very simple manner a most serious potential source of increase and unpredictability in the sensitivity of the device.

In operation the extending end portions 12a and 12b of the conductive resilient sheet 12 serve as two variable electrodes that are electrically connected to the base plate. The metal rod 13 serves as a fixed electrode. When a voltage is applied to the fixed electrode with respect to the base plate the two variable electrodes are caused to be drawn toward and to become coadunate with the fixed electrode. The insulative layer has a different reflectivity to electromagnetic radiation (e.g. light) than the outer surface of the variable electrodes and a distinct change in device reflectivity is accomplished by the application of the voltage.

The assembly of this device is accomplished very simply by applying a strip coating of adhesive centrally along the bottom of the groove and another adhesive strip coating along one side of the insulated rod. Then a flat rectangular piece of the conductive resilient material 12 is laid over the groove and the rod 13 with adhesive coating toward the groove is pressed against the resilient sheet 12 to adhesively mount both members 12 and 13 in the bottom of the groove 11. Alternative to adhesive bonding the rod 13 may be mechanically mounted to the groove bottom by any convenient means, without interrupting the electrical isolation between electrodes 12 and 13.

The rod need not be exactly positioned centrally in the groove and may vary as much as 20° from parallelism with the groove and be offset with respect to center of the groove by as much as 10% off center depending on the relative sizes of the groove width and fixed electrode diameter.

Also other groove shapes than rectangular may be used. For example, the groove may have curved wall surfaces. The fixed electrode may be other than a cylindrical rod, as shown for convenience, and may be ellipsoidal or have another shape having multiple parallel axes of curvature. The resilient sheet 12 may be other than a metal sheet as is shown for simplicity and clarity in the drawing. A thin sheet of plastic having one or both surfaces metallized is preferred. Half and quarter mil (0.0005 inch and 0.00025 inch) polyethyleneterephthalate having a few hundred angstrom aluminum metallized coatings on either one or both surfaces is suitable and readily available. The rod 13 and the base plate 10 may be any convenient metal such as aluminum. The insulative film 14 may be any dielectric insulative coating including lacquers and plastic.

Figure 2:
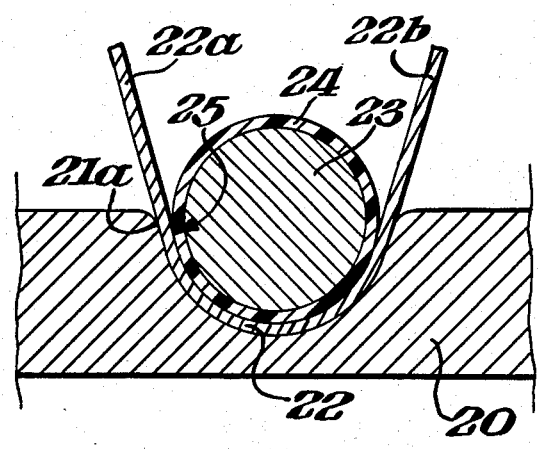
FIG. 2 shows a side sectional view of a second embodiment of an electrostatic device of this invention.

In a second preferred embodiment shown in FIG. 2, the fixed electrode 23 having an insulating film 24 thereover is an ellipsoid. The resilient conductive sheet 22 is pressed into an ellipsoidal groove, of base plate 20, having a slightly larger but essentially the same dimensions as the bottom portion of the ellipsoidal fixed electrode 23. Thus the variable electrodes are in contact with the groove and the fixed electrode over a broad area.

One end portion of the resilient sheet 22a extends from this area of insulated contact with the fixed electrode at a line of tangency 25. Preferably the further extending end portion 22a is finally restrained by groove carrier 21a, although it is possible that the line of tangency 25 with the fixed electrode and the restraining groove corner 21a are located at about the same place along the sheet end portion 22a.

A major advantage of the structure of the second embodiment is the self registration feature of the fixed electrode in the groove during assembly. This leads to a minimum requirement for operator judgement with near perfect alignment of the three pieces to be assembled. An array of such electrostatic devices on the same base plate or large number of such devices employing separate base plates can be assembled by an operator in a very short time.

What is claimed is:

1. An electrostatic device for the gating of electromagnetic radiation in response to an electrical signal, comprising a rod shaped fixed electrode, a sheet of resilient conductive material, a film of insulative material being interposed between said fixed electrode and said resilient sheet, and a metal base having a groove therein, a central region of said resilient sheet being mounted between said fixed electrode and the bottom of said groove, two opposite end portions of said resilient sheet extending in opposite directions from said mounting and each of said end portions further extending outwardly from said groove and being spring loaded between an outer edge of said groove and a line of tangency at which said resilient sheet is tangent to said fixed electrode, said two extending end portions of said resilient sheet serving as two variable electrodes capable of being electrostatically drawn over said fixed electrode.

2. The electrostatic device of claim 1 wherein said resilient sheet is flat in the nonstressed condition.

3. The electrostatic device of claim 1 wherein said resilient sheet has a broad curved surface portion that conforms to the shape of said groove.

4. The electrostatic device of claim 3 wherein said resilient sheet is in contact with essentially the whole wall area of said groove.

5. The electrostatic device of claim 1 wherein said insulative layer is bonded to said fixed electrode.

* * * * *